United States Patent
Yoon et al.

(10) Patent No.: US 9,566,706 B2
(45) Date of Patent: Feb. 14, 2017

(54) ROBOT AND CONTROL METHOD THEREOF

(71) Applicant: Samsung Electronics Co., Ltd., Suwon-si, Gyeonggi-do (KR)

(72) Inventors: Suk June Yoon, Seoul (KR); Young Do Kwon, Yongin-si (KR); Kyung Shik Roh, Seongnam-si (KR); Sung Hwan Ahn, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 28 days.

(21) Appl. No.: 14/532,166

(22) Filed: Nov. 4, 2014

(65) Prior Publication Data
US 2015/0197008 A1    Jul. 16, 2015

(30) Foreign Application Priority Data
Jan. 14, 2014  (KR) .................. 10-2014-0004467

(51) Int. Cl.
*B25J 9/00* (2006.01)

(52) U.S. Cl.
CPC .... *B25J 9/0006* (2013.01); *G05B 2219/40305* (2013.01); *Y10S 901/01* (2013.01); *Y10S 901/46* (2013.01)

(58) Field of Classification Search
CPC .............. B25J 9/0006; B25J 9/1664–9/1669; B25J 9/1674–9/1679; B25J 9/1964; B25J 11/009; B25J 13/08–13/087; B25J 13/089; B25J 19/02; G05B 19/401; G05B 19/406–19/4061; G05B 19/40305; G05B 19/40506; G05B 2219/40423; G05B 2219/40427; Y10S 901/01; Y10S 901/46; Y10S 901/50

USPC ............... 700/250, 253, 258; 901/2, 46, 50; 318/568.12, 568.16; 701/23, 25, 27
See application file for complete search history.

(56) References Cited

U.S. PATENT DOCUMENTS

| | | | |
|---|---|---|---|
| 6,560,512 B1 * | 5/2003 | Rosen .................... | B25J 9/1664 700/245 |
| 8,306,657 B2 * | 11/2012 | Yoshiike .............. | B62D 57/032 700/245 |
| 2006/0058920 A1 * | 3/2006 | Matsunaga ............ | B25J 9/1694 700/245 |
| 2006/0155436 A1 * | 7/2006 | Matsunaga .......... | G05D 1/0214 701/23 |

(Continued)

FOREIGN PATENT DOCUMENTS

| KR | 101082161 B1 | 11/2011 |
|---|---|---|
| KR | 20110125899 A | 11/2011 |

OTHER PUBLICATIONS

Improving_Odedra.pdf (Siddharth Odedra, Stephen D. Prior, and Mehmet Karamanoglu, Improving the Mobility Performance of Autonomous Unmanned Ground Vehicles by Adding the Ability to 'Sense/Feel' Their Local Environment, 2007, R. Shumaker (Ed.): Virtual Reality, HCII 2007, LNCS 4563, pp. 514-522).*

(Continued)

*Primary Examiner* — Bao Long T Nguyen
(74) *Attorney, Agent, or Firm* — Harness, Dickey & Pierce, P.L.C.

(57) ABSTRACT

Disclosed herein is a control method of a robot including: calculating hardness information about the ground on which a wearer moves; and controlling the robot according to the calculated hardness information.

9 Claims, 7 Drawing Sheets

(56) References Cited

U.S. PATENT DOCUMENTS

| | | | |
|---|---|---|---|
| 2010/0113980 A1* | 5/2010 | Herr | A61F 2/60 |
| | | | 600/587 |
| 2011/0082585 A1 | 4/2011 | Sofman et al. | |
| 2012/0253582 A1* | 10/2012 | Chrysanthakopoulos | G05D 1/024 |
| | | | 701/26 |
| 2013/0123672 A1 | 5/2013 | Goffer et al. | |
| 2014/0214205 A1* | 7/2014 | Kwon | A47L 9/2826 |
| | | | 700/258 |
| 2014/0277957 A1* | 9/2014 | Clar | E02F 5/32 |
| | | | 701/50 |

OTHER PUBLICATIONS

Realization_Hashimoto.pdf (Kenji Hashimoto, Hyun-jin Kang, Masashi Nakamura, Egidio Falotico, Hun-ok Lim, Atsuo Takanishi, Cecilia Laschi, Paolo Dario, and Alain Berthoz, Realization of Biped Walking on Soft Ground with Stabilization Control Based on Gait Analysis, 2012, IEEE, pp. 2064-2069).*

Shimada.pdf (Shigenobu Shimada , Tadashi Egami , Kosei Ishimura, and Mitsuo Wada, Neural Control of Quadruped Robot for Autonomous Walking on Soft Terrain, 2002, Springer-Verlag Tokyo, pp. 415-423).*

* cited by examiner

ROBOT AND CONTROL METHOD THEREOF

CROSS-REFERENCE TO RELATED APPLICATION

This application claims the benefit of Korean Patent Application No. 2014-0004467, filed on Jan. 14, 2014 in the Korean Intellectual Property Office, the entire disclosure of which is incorporated herein by reference.

BACKGROUND

1. Field

Example embodiments relate to a robot and a control method thereof, and more particularly, to a robot, and a control method of controlling the robot stably according to a user's surrounding environment.

2. Description of the Related Art

Robots are used for various purposes, for example, in military, industrial, and medical fields. Walking assist robots have been developed to help and assist peoples having difficulty in walking in interior and exterior environments. The walking assist robots can be classified into support-type walking assist robots and wearable walking assist robots.

The support-type walking assist robot may determine a user's walking intention to assist the user with walking. The support-type walking assist robot may include a body, a handle bar mounted on the body, and a plurality of wheels provided in the lower part of the body to move the body.

The wearable walking assist robot may be used to help rehabilitation and muscle power enhancement of elderly peoples and patients having low physical strength of lower extremity. The wearable walking assist robot has an exoskeleton structure such that it can be worn on a user's lower extremity.

SUMMARY

Therefore, one or more example embodiments provide a robot capable of switching to a walking assistance mode according to a user's surrounding walking environment, and a control method of the robot.

Additional aspects of the example embodiments will be set forth in part in the description which follows and, in part, will be obvious from the description, or may be learned by practice of the example embodiments.

Some example embodiments are directed toward a control method of a robot.

In some example embodiments, the control method includes: calculating hardness information about the ground on which a wearer moves; and controlling the robot according to the hardness information.

Other example embodiments are directed toward a robot.

In some example embodiments, the robot includes: a calculator configured to calculate hardness information about the ground on which a wearer moves; and a control signal generator configured to generate a control signal for controlling the robot based on the hardness information.

Therefore, since a control mode of a robot is switched, for example, automatically, according to an environment around the robot, usability of the robot can be improved.

BRIEF DESCRIPTION OF THE DRAWINGS

These and/or other aspects of the example embodiments will become apparent and more readily appreciated from the following description of some of the example embodiments, taken in conjunction with the accompanying drawings of which.

DETAILED DESCRIPTION

Figure 1:
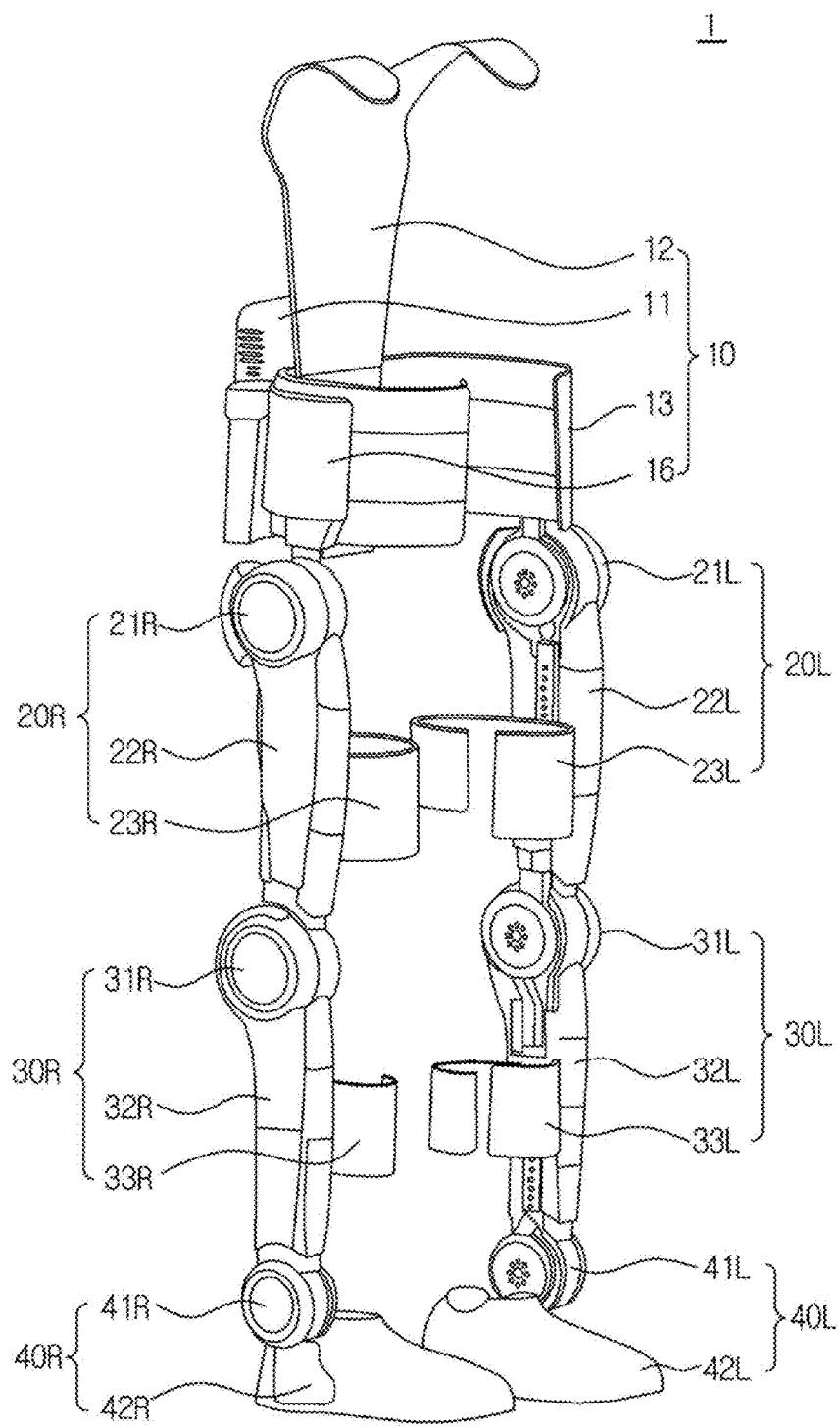
FIG. 1 is a perspective view of a front part of a walking assist robot according to some example embodiments.

Reference will now be made in detail to example embodiments, some examples of which are illustrated in the accompanying drawings, wherein like reference numerals refer to like elements throughout.

In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising,"

"includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Hereinafter, a walking assist robot and a control method thereof according to some example embodiments will be described with reference to the appended drawings.

In this specification, a robot may include a mobile robot and a walking assist robot. The mobile robot may include an unmanned robot that can move without setting a person thereon, and a manned robot on which a person can ride. The walking assist robot may include a support-type walking assist robot and a wearable walking assist robot.

The support-type walking assist robot may include a body that can be moved by a plurality of wheels, and a handle bar which is mounted on the upper part of the body, with which a user can adjust a moving direction of the body, and against which the user can lean. The wearable walking assist robot may have an exoskeleton structure such that it can be worn on at least one of a user's both legs. In the following description, the wearable walking assist robot will be described as an example of a walking assist robot, however, as discussed above, example embodiments are not limited thereto. Also, for convenience of description, the wearable walking assist robot is simply referred to as a "walking assist robot".

Figure 2:
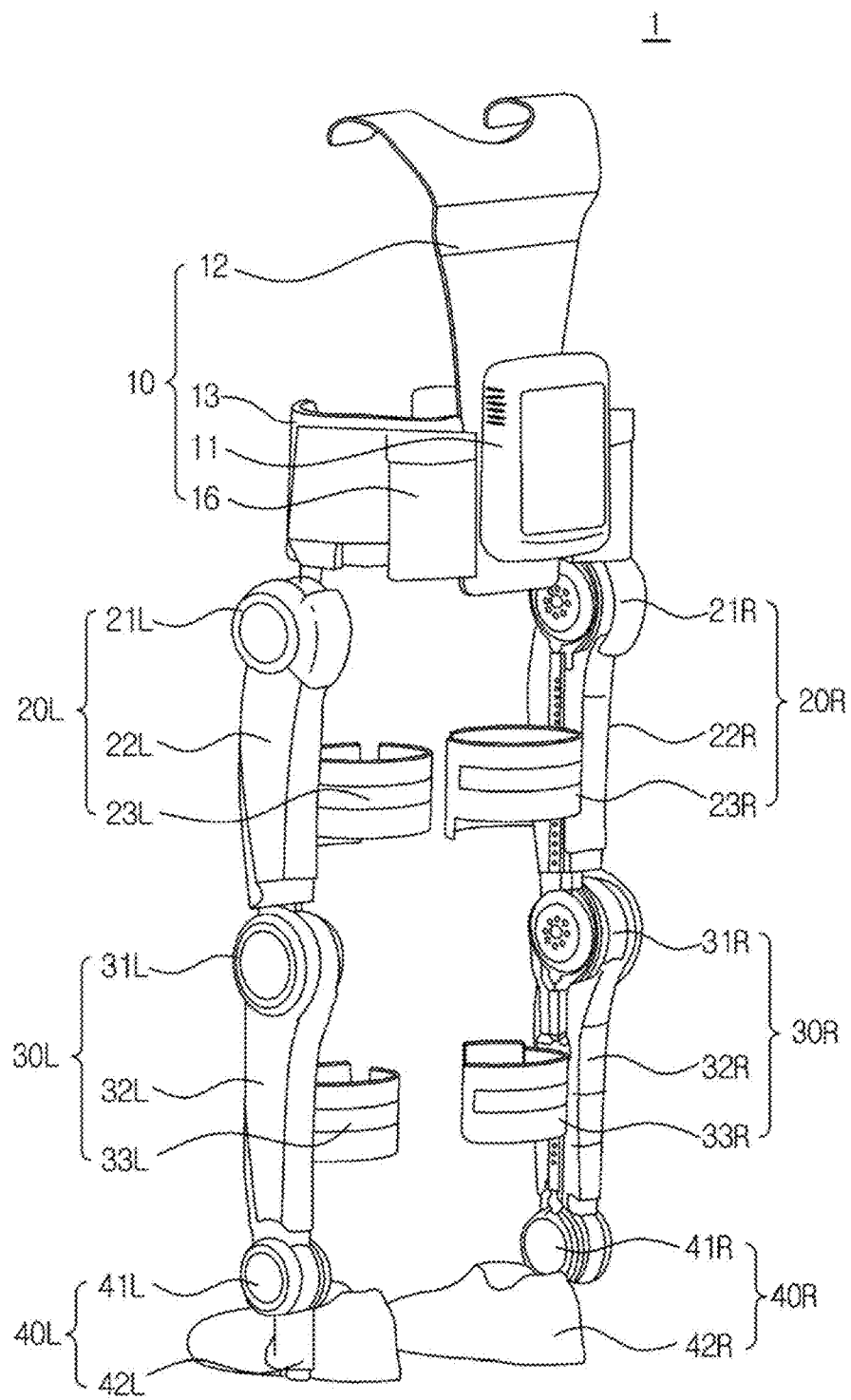
FIG. 2 is a perspective view of a rear part of a walking assist robot according to some example embodiments.

FIG. 1 is a perspective view of a front part of a walking assist robot according to some example embodiments, and FIG. 2 is a perspective view of a rear part of a walking assist robot according to some example embodiments.

As shown in FIGS. 1 and 2, a walking assist robot 1 has an exoskeleton structure such that it can be worn on a wearer's left and right legs. The wearer wearing the walking assist robot 1 can perform motions, such as extension, flexion, adduction, abduction, etc. The extension is a motion of extending joints, and the flexion is a motion of bending joints. The adduction is a motion of gathering legs toward the central axis of the body, and the abduction is a motion of spreading legs away from the central axis of the body.

Referring to FIGS. 1 and 2, the walking assist robot 1 may include a main body 10, first structures 20R and 20L, second structures 30R and 30L, and third structures 40R and 40L.

The main body 10 may include a housing 11, a waist securing unit 13, a waist supporting unit 12, and a power supply 16.

The housing 11 may accommodate various components therein. The components may include a processor. The processor may be a Central Processing Unit (CPU), a Graphic Processing Unit (GPU), a Printed Circuit Board (PCB). Further, the housing 11 may include various kinds of storage units, and an Inertial Measurement Unit (IMU). For example, the IMU may be installed inside or outside the housing 11. More specifically, the IMU may be mounted on a PCB installed in the housing 11. The IMU may include an inertial sensor. The inertial sensor may measure acceleration and angular velocity.

As discussed in more detail below with regard to FIG. 3, the CPU may be a micro processor. The micro processor is a processing device in which an Arithmetic Logic Unit (ALU), a register, a program counter, a command decoder, a control circuit, etc. are installed in a silicon chip. If place name information is input from a wearer, the CPU may search for a walking environment map related to the place name information, and set the wearer's initial location on the walking environment map. Thereafter, if the wearer walks so that the wearer's location changes, the CPU may estimate the wearer's current location based on information sensed by various sensors of a sensor unit. Then, the CPU may determine a walking environment around the wearer's current location based on the wearer's estimated current location and the walking environment map. Thereafter, the CPU may select a control mode suitable for the walking environment, and generate control signals for controlling operations of the first to third structures 20R, 20L, 30R, 30L, 40R, and 40L according to the selected control mode.

The GPU is a processing device for processing information related to graphics in the micro processor. The GPU may assist a graphic processing function of the CPU, or may perform graphic processing independently. The GPU may perform image processing on the walking environment map found by the CPU. For example, the GPU may display the wearer's initial location on the walking environment map, or the wear's estimated current location on the walking environment map.

The PCB is a board on which circuitry is printed, and the CPU, the GPU, and various kinds of storage units may be mounted on the PCB. The PCB may be fixedly mounted on the inner side surface of the housing 11.

The housing 11 may accommodate various kinds of storage units therein. The storage units may include a magnetic disk storage device that magnetizes the surface of a magnetic disk to store data, and a semiconductor memory device that stores data using various kinds of memory semiconductors. According to an embodiment, the storage units may store the walking environment map.

The walking environment map may include information about the ground. According to an embodiment, the information about the ground may include hardness information about the ground. For example, the ground may be composed of concrete, sands (sands of the playground), or carpet, having different degrees of hardness. Specifically, the hardness degree of the ground increases in the order of carpet, sands, and concrete.

According to other example embodiments, the information about the ground may further include geometric information about the ground other than hardness information about the ground. The geometric information about the ground may include information about a shape of the ground, and the shape of the ground may be, for example, an even ground, an ascent slope, a descent slope, an ascent stair, or a descent stair.

In the following description, a case in which a walking environment map includes, as information about the ground, both hardness information about the ground and geometric information about the ground will be described as an example, however, example embodiments are not limited thereto.

The IMU included in the housing 11 may include an inertial sensor. The inertial sensor may measure acceleration and angular velocity of the walking assist robot 1.

The power supply 16 may be provided inside or outside the housing 11. For example, the power supply 16 may be mounted on the PCB installed in the housing 11. The power supply 16 may be separated from the housing 11 or from the PCB in the housing 11, or the power supply 16 may be charged by an external device (not shown). The power supply 16 may supply power to various components installed in the housing 11 or to the first to third structures 20R, 20L, 30R, 30L, 40R, and 40L.

The waist securing unit 13 functions to dispose the housing 11 on the wearer's waist. The waist securing unit 13 may have a shape of a curved plate so as to support the wearer's waist. Although not shown in the drawings, the waist securing unit 13 may further include a fastening unit for fastening the waist securing unit 13 on the wearer's waist. The fastening unit may be implemented with a band or a belt. The length of the fastening unit may be adjustable. In this case, the fastening unit may fasten the waist securing unit 13 on the wearer's waist regardless of the wearer' waist circumference.

The waist supporting unit 12 may be connected to the waist securing unit 13. The waist supporting unit 12 may have a shape of a curved plate so as to support the wearer's back, and have a curved shape whose one end can be put on the wearer's both shoulders, as shown in FIGS. 1 and 2. The shape of the waist supporting unit 12 is not limited to this, and the waist supporting unit 12 may have a specific shape corresponding to the shape of the wearer's back and/or shoulders.

The first structures 20R and 20L may support movements of the wearer's hip joints and thighs when the wearer walks. To do this, the first structures 20R and 20L may include first joints 21R and 21L, first links 22R and 22L, and first securing units 23R and 23L.

The first joints 21R and 21R correspond to a human body's hip joints. The first joints 21R and 21L may rotate within the operating range of the wearer's hip joints. To do this, the first joints 21R and 21L may have at least 1 Degree of Freedom (DOF).

Herein, the DOF is a DOF in Forward Kinematics or in Inverse Kinematics. DOF of mechanism means the number of independent motions of mechanism, or the number of independent parameters that are required to specify a relative position with respect to links. For example, an object that is in a 3Dimensional (3D) space composed of x-, y-, and z-axes has one or more DOF of 3 DOF (positions on the respective axes) to specify a spatial position of the object, and 3 DOF (rotation angles with respect to the respective axes) to specify a spatial orientation of the object. If a certain object is movable on the individual axes and rotatable with respect to the individual axes, the object can be understood to have 6 DOF.

As discussed below with reference to FIG. 3, first drivers 210R and 210L may be provided in the first joints 21R and 21L. The first drivers 210R and 210L may be driven according to control signals that are provided from the main body 10, and generate various magnitudes of rotatory power in various directions. The rotatory power generated by the first drivers 210R and 210L may be applied to the first links 22R and 22L connected to the first joints 21R and 21L.

The first drivers 210R and 210L may be ones of motors, vacuum pumps, and hydraulic pumps. However, the first drivers 210R and 210L are not limited to these. In the following description, the first drivers 210R and 210L are assumed to be motors, however, example embodiments are not limited thereto.

The first links 22R and 22L may be physically connected to the first joints 21L and 21R. The first links 22R and 22L may rotate by a desired (or, alternatively, a predetermined) angle according to rotatory power generated by the first drivers 210R and 210L of the first joints 21R and 21L.

The first links 22R and 22L may be designed in various shapes. For example, the first links 22R and 22L may be configured with a plurality of nodes connected to each other. In this case, joints may be disposed between nodes, and the first links 22R and 22L may be bent within a desired (or, alternatively, a predetermined) range by the joints. As another example, the first links 22R and 22L may be designed in a bar shape. In this case, the first links 22R and 22L may be made of a flexible material so that the first links 22R and 22L can be bent within a desired (or, alternatively, a predetermined) range.

The first securing units 23R and 23L may be attached on the first links 22R and 22L, respectively. The first securing units 23R and 23L function to secure the first links 22R and 22L on the wearer's thighs. FIGS. 1 and 2 show a case in which the first links 22R and 22L are secured on the outer sides of the wearer's thighs by the first securing units 23R and 23L. If the first links 22R and 22L move according to rotation of the first joints 21R and 21L, the wearer's thighs on which the first links 22R and 22L are secured move accordingly in the movement direction of the first links 22R and 22L.

According to some example embodiments, each of the first securing units 23R and 23L may be implemented with an elastic band, an elastic belt, an elastic strap, a flexible metal material, or a combination of two or more of the above-mentioned materials. The first securing units 23R and 23L may be referred to as clamps.

The second structures 30R and 30L may support movements of the wearer's knee joints and shanks when the wearer walks. To support the wearer's knees, the second structures 30R and 30L may include second joints 31R and 31L, second links 32R and 32L, and second securing units 33R and 33L.

The second joints 31R and 31L may correspond to a human body's knee joints. The second joints 31R and 31L may rotate within the operating range of the wearer's knee joints. To do this, the second joints 31R and 31L may have at least 1 Degree of Freedom (DOF).

As discussed below with reference to FIG. 3, second drivers 310R and 310L may be provided in the second joints 31R and 31L. The second drivers 310R and 310L may be driven according to control signals that are provided from the main body 10, and generate various magnitudes of rotatory power in various directions. The rotatory power generated by the second drivers 310R and 310L may be applied to the second links 32R and 32L connected to the second joints 31R and 31L.

The drivers 310R and 310L may be ones of motors, vacuum pumps, and hydraulic pumps. However, the second drivers 310R and 310L are not limited to these. In the following description, the second drivers 310R and 310L are assumed to be motors, however, example embodiments are not limited thereto.

The second links 32R and 32L may be physically connected to the second joints 31L and 31R. The second links 32R and 32L may rotate by a desired (or, alternatively, a predetermined) angle according to rotatory power generated by the second drivers 310R and 310L of the second joints 31R and 31L.

The second links 32R and 32L may be designed in various shapes. For example, the second links 32R and 32L may be configured with a plurality of nodes connected to each other. In this case, joints may be disposed between nodes, and the second links 32R and 32L may be bent within a desired (or, alternatively, a predetermined) range by the joints. As another example, the second links 32R and 32L may be designed in a bar shape. In this case, the second links 32R and 32L may be made of a flexible material so that the second links 32R and 32L can be bent within a desired (or, alternatively, a predetermined) range.

The second securing units 33R and 33L may be attached on the second links 32R and 32L, respectively. The second securing units 33R and 33L function to secure the second links 32R and 32L on the wearer's shanks. FIGS. 1 and 2 show a case in which the second links 32R and 32L are secured on the outer sides of the wearer's shanks by the second securing units 33R and 33L. If the second links 32R and 32L move according to rotation of the second joints 31R and 31L, the wearer's shanks on which the second links 32R and 32L are secured may move accordingly in the movement direction of the second links 32R and 32L.

According to some example embodiments, each of the second securing units 33R and 33L may be implemented with an elastic band, an elastic belt, an elastic strap, a flexible metal material, or a combination of two or more of the above-mentioned materials. The second securing units 33R and 33L may be referred to as clamps.

The third structures 40R and 40L may support movements of the wearer's ankle joints and feet when the wearer walks. To support the wearer's ankles, the third structures 40R and 40L may include third joints 41R and 41L and foot rest units 42R and 42L.

The third joints 41R and 41L correspond to a human body's ankle joints. The third joints 41R and 41L may rotate within the operating range of the wearer's ankle joints. To do this, the third joints 41R and 41L may have at least 1 DOF.

As discussed below with reference to FIG. 3, third drivers 410R and 410L may be provided in the third joints 41R and 41L. The third drivers 410R and 410L may be driven according to control signals that are provided from the main body 10, and generate various magnitudes of rotatory power in various directions. The rotatory power generated by the third drivers 410R and 410L may be applied to the foot rest units 43R and 43L connected to the third joints 41R and 41L.

The third drivers 410R and 410L may be ones of motors, vacuum pumps, and hydraulic pumps. However, the third drivers 410R and 410L are not limited to these. In the following description, the third drivers 410R and 410L are assumed to be motors, however, example embodiments are not limited thereto.

The foot rest units 42R and 42L may be provided to correspond to the locations of the wearer's feet, and physically connected to the third joints 41R and 41L. Each of the foot rest units 42R and 42L may include at least one sensor.

For example, each of the foot rest units 42R and 42L may include a pressure sensor. The pressure sensor may sense the wearer's weight, and the result of sensing by the pressure sensor may be used to determine whether the wearer wears the walking assist robot 1, whether the wearer stands up, whether the wearer's foot contacts the ground, etc.

As another example, each of the foot rest units 42R and 42L may include a force sensor. The force sensor may sense a ground reaction force applied to the wearer from the ground when the wearer's foot contacts the ground. The result of sensing by the force sensor may be used to calculate hardness information about the ground around the walking assist robot 1.

Each of the foot rest units 42R and 42L may include one or both of a pressure sensor and a force sensor. Also, each of the foot rest units 42R and 42L may further include another sensor than a pressure sensor and a force sensor.

Figure 3:
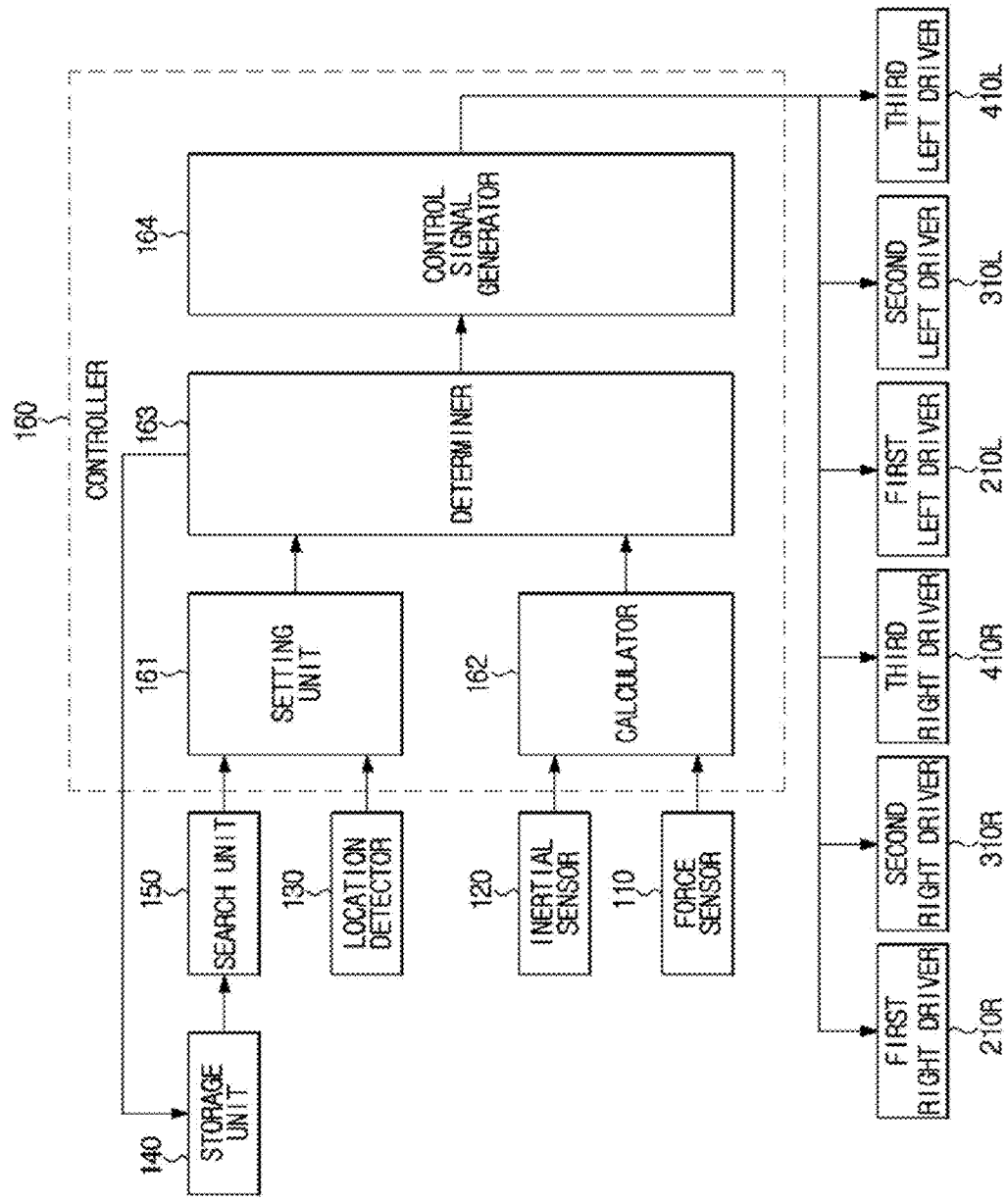
FIG. 3 is a block diagram illustrating a configuration of a walking assist robot according to some example embodiments.

FIG. 3 is a block diagram illustrating a configuration of the walking assist robot 1 according to some example embodiments.

Referring to FIG. 3, the walking assist robot 1 may include one or more force sensors 110, an inertial sensor 120, a location detector 130, a storage unit 140, a search unit 150, a controller 160, and drivers 210R, 210L, 310R, 310L, 410R, and 410L.

The force sensors 110 may be, as described above, provided in the foot rest units 42R and 42L. According to some example embodiments, the force sensors 110 may be individually provided at locations corresponding to a human body's heels and foresoles. According to other example embodiments, a single force sensor 110 may be provided at a location corresponding to a human body's ankle.

The inertial sensor 120 may be provided at a location corresponding to a human body's waist or pelvis. More specifically, the inertial sensor 120 may be mounted on a PCB installed in the housing 11 (see FIG. 2). The inertial sensor 120 may sense a wearer's acceleration or angular velocity. The result of sensing by the inertial sensor 120 may be used to calculate hardness information about the ground around the walking assist robot 1.

The location detector 130 may detect the wearer's location based on data received from an external device. According to some example embodiments, the location detector 130 may receive data from a plurality of base stations, and detect the wearer's location based on triangulation. According to other example embodiments, the location detector 130 may detect the wearer's location based on satellite signals received from a plurality of satellites.

The walking assistance robot 1 may perform location detection when power is supplied to the walking assist robot 1, or when the wearer moves to another place. For example, the walking assistance robot 1 may perform the location detection automatically when the wearer moves to another building or to another floor in the same building.

According to other example embodiments, the walking assistance robot 1 may perform the location detection when a location detection command is received. The wearer may input a location detection command by pressing a location detection button (not shown) provided in an input unit (not shown) of the walking assist robot 1.

The storage unit 140 may store a walking environment map which includes a hardness map. The walking environment map may include information about the ground. According to some example embodiments, the information about the ground may include hardness information about the ground and geometric information about the ground. The hardness information about the ground represents a degree of hardness or softness of the ground. For example, the hardness information may indicate whether the ground is composed of concrete, sands (e.g., sand of a playground), or carpet. The geometric information about the ground is information about the shape of the ground. The shape of the ground may be, for example, an even ground, an ascent slope, a descent slope, an ascent stair, or a descent stair. Hereinafter, the walking environment map will be described in more detail with reference to FIG. 4.

Figure 4:
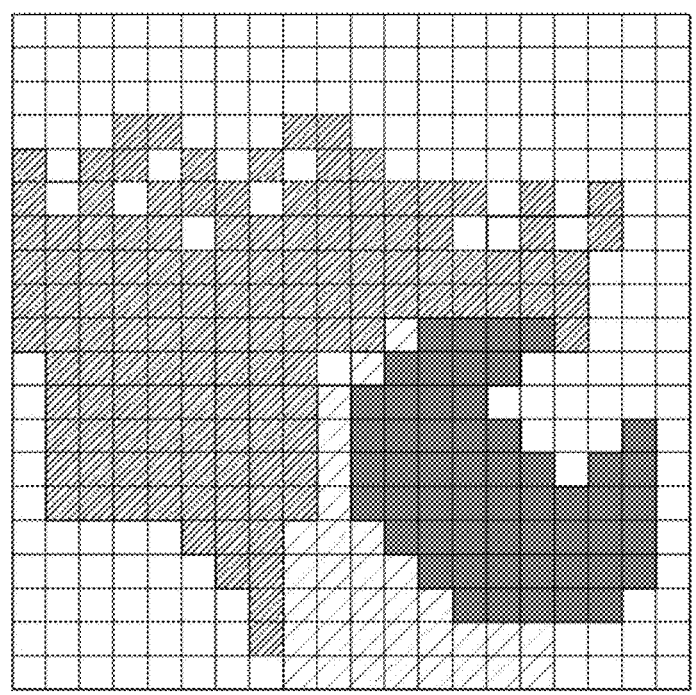
FIG. 4 shows a walking environment map according to some example embodiments.

FIG. 4 shows a walking environment map according to some example embodiments.

As shown in FIG. 4, the walking environment map may be divided into a plurality of grids. The width and height of each grid may depend on a human's stride. For example, if an average human stride is 30 cm, the width and height of each box in the grid may be set to 30 cm. According to some example embodiments, hardness information and geometric information about the ground may be mapped to each box of the grid.

The hardness of the walking environment (e.g. the ground) may vary, and, therefore, in the walking environment map of FIG. 4, the various boxes in the grid may have different harnesses as illustrated by their respective brightness. For example, grids of lower brightness may correspond to harder ground, and grids of higher brightness may correspond to softer ground, however, example embodiments are not limited thereto.

The walking environment map shown in FIG. 4 is provided as an example, and according to other example embodiments, a value representing hardness information of the ground may be mapped to each grid. For example, a reaction force applied to the walking assist robot 1 from the ground may be mapped to boxes in the grid. Alternatively, a spring coefficient and a damper coefficient of the ground may be mapped to boxes of the grid. Further still, a reaction force applied to the walking assist robot 1 from the ground, and a spring coefficient and a damper coefficient of the ground may all be mapped to boxes of the grid.

In some example embodiments, the walking environment map shown in FIG. 4 may be acquired in advance. For example, geometric information about the ground may be acquired by moving a mobile robot including a 3Dimensional (3D) laser sensor to acquire 3D point cloud data and projecting the 3D point cloud data onto a 2Dimensional (2D) plane. As another example, geometric information about the ground may be acquired by designating information about stairs and slopes from an interior floor plan of a building or house. Hardness information about the ground may be acquired in advance according to a kind of a material configuring the ground.

The walking environment map may be received from an external device (not shown) such as a server. In order to receive the walking environment map, the walking assist robot 1 may further include a communication unit (not shown) for communicating with an external device. The walking assistance map received from an external device such as a server may be stored in the storage unit 140. According to an embodiment, the walking assist robot 1 may calculate hardness information about the ground around the walking assist robot 1, based on the result of sensing by the force sensor 110 or the inertial sensor 120, compare the calculated hardness information to hardness information of the walking environment map, and update hardness information of the walking environment map based on the result of the comparison. The walking environment map in which hardness information has been updated may be transmitted to the external device such as the server. The walking environment map transmitted to the external device such as the server may be provided to another walking assist robot.

Referring again to FIG. 3, the storage unit 140 may store the walking environment map as described above. Also, the storage unit 140 may store various data or algorithms needed for operations of the walking assist robot 1, other than the walking environment map. For example, the storage unit 140 may store data or algorithms for controlling the walking assist robot 1 according to a control mode.

The storage unit 140 may be a nonvolatile memory device, a volatile memory device, a hard disk drive, an optical disk drive, or a combination of two or more of the above-mentioned devices.

The search unit 150 may search for a walking environment map in the storage unit 140. According to some example embodiments, the search unit 150 may search for a walking environment map corresponding to a place where the wearer is located, based on the result of location detection by the location detector 130. For example, if it is determined that the wearer is located in a specific city in a specific country, based on the result of location detection, the search unit 150 may search for a walking environment map about the corresponding city. As another example, if it is determined that the wearer is located in a specific building such as a library or museum, based on the result of location detection, the search unit 150 may search for a walking environment map about the corresponding building.

As another example, the search unit 150 may search for a walking environment map when a walking environment map search command is received. More specifically, a wearer may input information, such as a place name or a building name, using at least one character key and/or at least one numeral key provided in an input unit (not shown) of the walking assist robot 1, and then select an execution button (not shown) for searching for a walking environment map. Then, the search unit 150 may search for a walking environment map corresponding to the place name or the building name.

While the search unit 150 and the location detector 130 are illustrated in FIG. 3 as being outside of the controller 160, the search unit 150 and the location detector 130 may be embodied as a module within the controller 160.

The controller 160 may connect individual components in the walking assist robot 1, and control the individual components. Also, the controller 160 may calculate hardness information about the ground around the walking assist robot 1, based on the results of sensing by the force sensor 110 and the inertial sensor 120, and generate control signals that are to be provided to the respective drivers 210R, 210L, 310R, 310L, 410R, and 410L of the walking assist robot 1, according to the calculated hardness information.

The controller 160 may include a processor and a memory.

Figure 7:
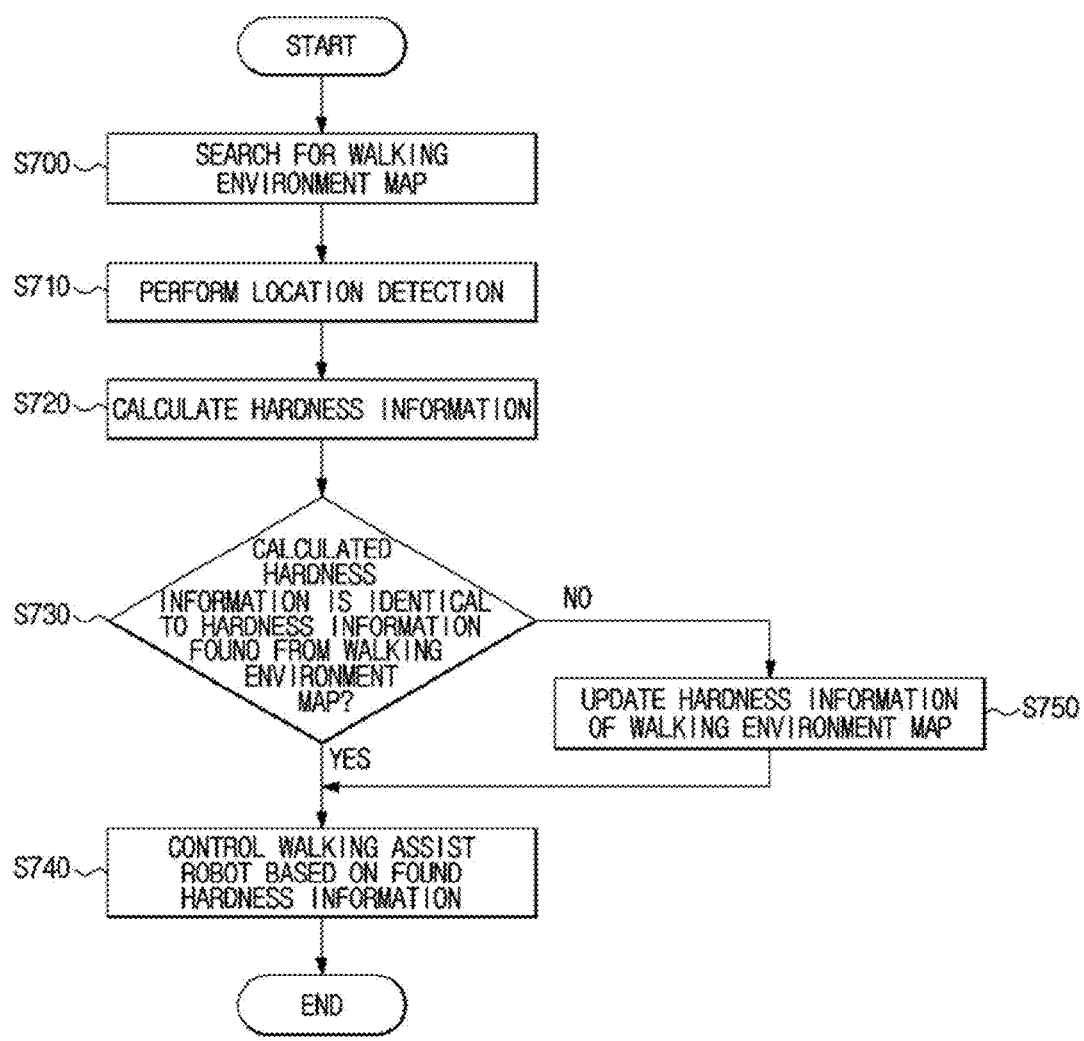
FIG. 7 is a flowchart illustrating a control method of a walking assist robot, according to some example embodiments.

The processor may be an arithmetic logic unit, a digital signal processor, a microcomputer, a field programmable array, a programmable logic unit, a microprocessor or any other device capable of responding to and executing instructions in a defined manner such that the processor is programmed with instructions that configure the processing device as a special purpose computer to perform the operations illustrated in FIG. 7, such that the controller 160 is configured to calculate hardness information about the ground around the walking assist robot 1 based on the results of sensing by the force sensor 110 and the inertial sensor 120, compare the calculate hardness information to a walking environment map and control the walking assistance robot 1 based on the hardness information. For example, the controller 160 may determine a walking environment based on the walking environment map and control the first to third structures 20, 30 and 40 of the robot 1 by operating in a control mode that is suitable for the determined walking environment.

Further, the controller 160 may be programmed with instructions that configure the controller 160 to update the hardness information in the walking environment map based on the result of the sensing.

The processor, when programmed with the instructions, may be configured to perform as a setting unit 161, a calculator 162, a determiner 163, and a control signal generator 164. Further, the instructions may program the processor to perform as the location detector 130 and the search unit 150.

The setting unit 161 may set a wearer's initial location detected by the location detector 130 on a walking environment map found by the search unit 150. The walking environment map on which the wearer's initial location has been set may be provided to the determiner 163 which will be described later.

If the wearer moves from the initial location, the calculator 162 may estimate the wearer's current location based on the results of sensing by various sensors, such as the force sensor 110, the inertial sensor 120, a pressure sensor (not shown), etc. More specifically, if the wearer moves after the wearer's initial location is set on the walking environment map, the inertial sensor 120 may measure acceleration and angular velocity according to the wearer's movement. Then, the location estimator 240 may estimate the wearer's current location based on the acceleration and angular velocity measured by the inertial sensor 120.

Also, the calculator 162 may calculate hardness information about the ground around the walking assist robot 1, based on the results of sensing by the force sensor 110 and the inertial sensor 120. The hardness information about the ground around the walking assist robot 1 may be calculated based on a ground reaction force sensed by the force sensor 110 and acceleration sensed by the inertial sensor 120, when the wearer's foot contacts the ground. This will be described in more detail with reference to FIGS. 5 and 6, below.

Figure 5:
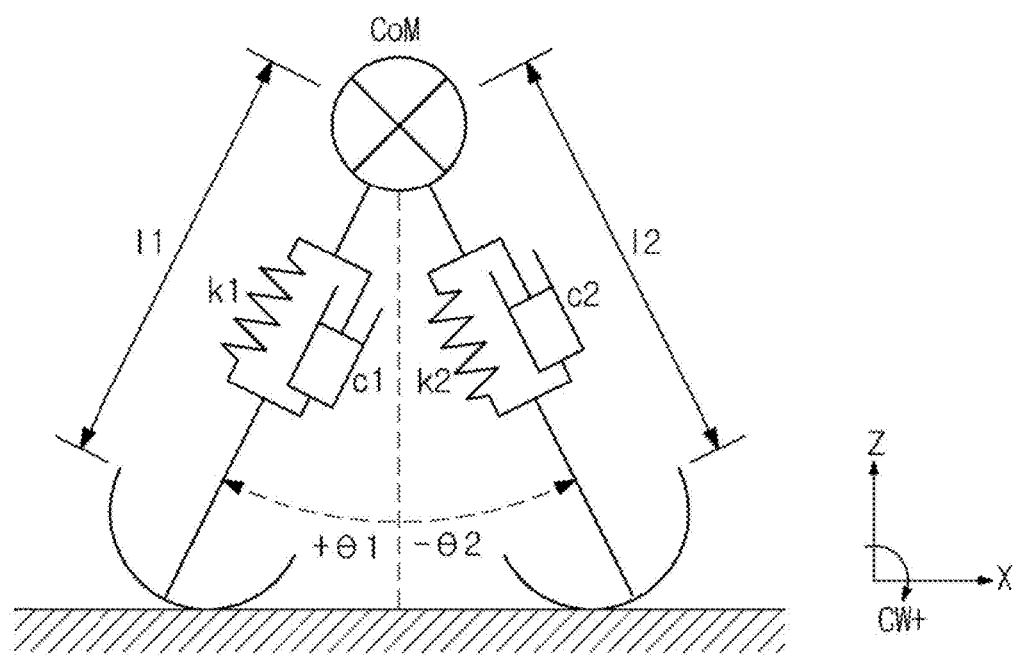
FIG. 5 shows an example of a mathematical model of a mechanical system for a walking assist robot.

FIG. 5 shows an example of a mathematical model of a mechanical system for the walking assist robot 1.

As shown in FIG. 5, each leg of the walking assist robot 1 may be modeled as a spring-damper-mass system. In FIG. 5, k1 and k2 represent spring coefficients, and c1 and c2 represent damper coefficients. Also, l1 and l2 represent the lengths of two legs. CoM represents the center of gravity of the walking assist robot 1. The inertial sensor 120 (see FIG. 3) may be positioned at or around the center of gravity of the walking assist robot 1.

If a wearer's one leg contacts the ground when each leg of the walking assist robot 1 is modeled as the spring-damper-mass system, a force applied to the leg contacting the ground can be expressed as Equation (1), below.

$$F = mg' + cg'' + kg \quad (1)$$

In Equation (1), F represents a ground reaction force applied to the leg contacting the ground, m represents the wearer's mass, c represents a damper coefficient of the leg contacting the ground, and k represents a spring coefficient of the leg contacting the ground, and g represents a gravitational force.

The ground reaction force F may be acquired by the force sensor 110 (see FIG. 3) included in the foot rest unit 42R or 42L (see FIG. 1 or 2) corresponding to the leg contacting the ground. The wearer's mass m may be acquired by the pressure sensor, and the gravitational force g may be acquired by the inertial sensor 120. If g is acquired by the inertial sensor 120, g' may be acquired by differentiating the g, and g'' may be acquired by differentiating the g'. If the F, m, g', and g'' are acquired, k which is the spring coefficient of the leg contacting the ground, and c which is the damper coefficient of the leg contacting the ground can be calculated. The spring coefficient k and the damper coefficient c of the leg can be considered to be proportional to a spring coefficient and a damper coefficient with respect to the ground. This will be described in more detail with reference to FIG. 6, below.

Figure 6:
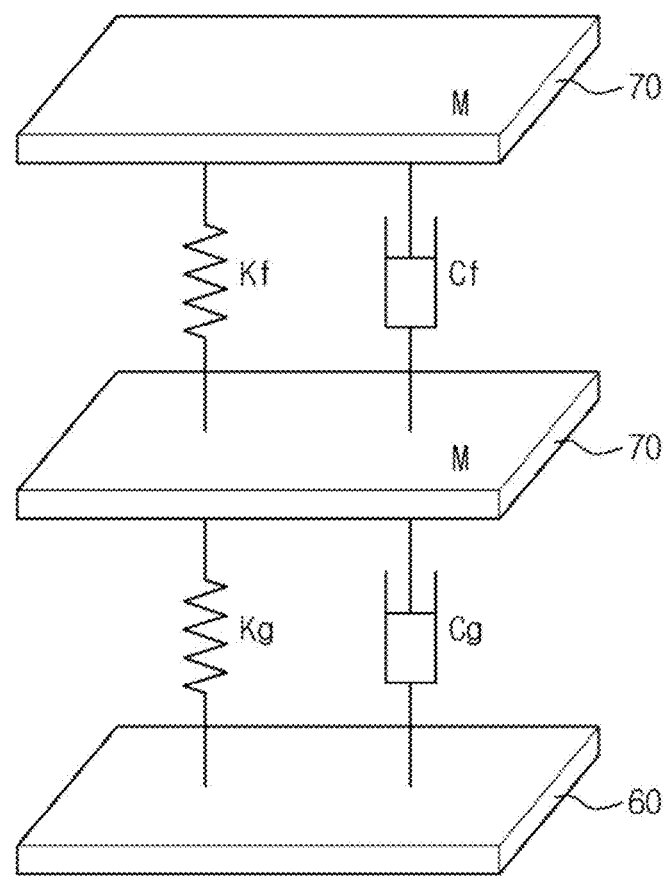
FIG. 6 shows an example of a mathematical model of the ground shown in FIG. 5.

FIG. 6 shows an example of a mathematical model of the ground shown in FIG. 5.

Referring to FIG. 6, the ground is composed of a base layer, and a floor layer formed on the base layer. Accordingly, a spring-damper-mass system for the ground may be modeled as shown in FIG. 6.

If it is assumed that hardness of the base layer is very high, Ke which is a spring coefficient of the base layer, and Ce which is a damper coefficient of the base layer can be considered as nearly constant values at any place. However, Kf which is a spring coefficient of the floor layer, and Cf which is a damper coefficient of the floor layer have different values according to a kind of the floor material. Since different kinds of floor materials are used in different places, a ground reaction force measured from a wearer's foot contacting the ground may be decided according to a spring coefficient and a damper coefficient of the floor material of the corresponding ground.

Accordingly, the controller 160 can obtain hardness information of the walking environment map by calculating a spring coefficient and a damper coefficient for a place corresponding to each grid of a walking environment map in advance using Equation (1), and then mapping the calculated coefficients to the corresponding grid.

The above description relates to a case of calculating hardness information that is to be mapped to each grid of a walking environment map, using Equation (1). Equation (1) can be also used to calculate hardness information about the ground around the walking assist robot 1 when a wearer wearing the walking assist robot 1 moves.

Referring again to FIG. 3, when a wearer wearing the walking assist robot 1 moves, the calculator 162 may calculate hardness information about the ground around the walking assist robot 1, based on the result of sensing by the pressure sensor, the force sensor 110, and the inertial sensor 120. That is, the calculator 162 may calculate a spring coefficient and a damper coefficient of a leg contacting the ground, using Equation (1), as described above. The calculated hardness information, that is, the spring coefficient and the damper coefficient may be provided to the determiner 163 which will be described later.

Also, if the wearer moves after the wearer's initial location is set on the walking environment map, the wearer's current location may be estimated based on the results of sensing by the individual sensors, and the estimated wearer's current location may be provided to the determiner 163.

The determiner 163 may determine a walking environment around the wearer, with reference to the walking environment map, the wearer's current location, and the calculated hardness information. For example, the determiner 163 may search for a grid corresponding to the wearer's current location in the walking environment map, and then determine a walking environment around the wearer based on hardness information and geometric information of the ground mapped to the found grid.

Thereafter, the determiner 163 may switch a control mode of the walking assist robot 1 according to the determined walking environment. More specifically, the determiner 163 may switch a control mode of the walking assist robot 1 according to geometric information about the ground around the wearer. For example, if the determiner 163 determines that the ground around the wearer is an ascent slope, the determiner 163 may switch the control mode of the walking assist robot to a control mode corresponding to an ascent slope.

Also, the determiner 163 may update the walking environment map according to the determined walking environment. More specifically, the determiner 163 may determine whether the hardness information mapped to the grid is the same as hardness information calculated by the calculator 162. If the determiner 163 determines that the hardness information mapped to the grid is the same as hardness information calculated by the calculator 162, the determiner 163 may provide hardness information found from the walking environment map to the control signal generator 164. Meanwhile, if the determiner 163 determines that the hardness information mapped to the grid is not the same as hardness information calculated by the calculator 16, the determiner 163 may update the hardness information found from the walking environment map to hardness information calculated by the calculator 162, and then provide the updated hardness information to the control signal generator 164.

The control signal generator 164 may generate control signals that are to be provided to the individual drivers 210R, 210L, 310R, 310L, 410R, and 410L, based on the control mode switched by the determiner 163 and hardness information provided from the determiner 163. For example, if the control mode of the walking assist robot 1 has been switched to a control mode corresponding to an ascent slope, and an inclination of the ascent slope is high, the control signal generator 164 may generate control signals so that the walking assist robot 1 can move to correspond to the ascent slope, and a ground reaction force applied to the wearer is not great when each leg of the walking assist robot 1 contacts the ascent slope.

FIG. 7 is a flowchart illustrating a control method of the walking assist robot 1, according to an embodiment of the present disclosure.

Referring to FIGS. 3 and 7, in operation S700, the search unit 150 may search for a walking environment map in the storage unit 140.

Then, in operation S710, the location detector 130 may detect a wearer's location. According to some example embodiments, when power is supplied to the walking assist robot 1, or when the wearer moves to another place, the location detector 130 may automatically detect the wearer's location. According to other example embodiments, the detector 130 may detect the wearer's location when the wearer inputs a location detection command. After the wearer's location is detected, the controller 160 may set the wearer's location on the walking environment map.

In operation S720, if the wearer moves, the controller 160 may calculate hardness information about the ground around the wearer based on the results of sensing by individual sensors. For example, the controller 160 may calculate a spring coefficient and a damping coefficient of a leg contacting the ground using Equation (1).

The controller 160 may determine a walking environment around the wearer by searching a grid corresponding to the wearer's current location in the walking environment map based on hardness information and geometric information of the ground mapped to the grid.

In operation S730, the controller 160 may determine whether the hardness information calculated in operation S720 is substantially the same as the hardness information found from the walking environment map.

In operation S750, if the controller 160 determines that the calculated hardness information is not substantially the same as the found hardness information, the controller 160 may update the hardness information of the walking environment map. More specifically, the hardness information of the walking environment map may be updated to the calculated hardness information.

In operation S740, if the controller 160 determines that the calculated hardness information is substantially the same as the found hardness information, the controller 160 may control the walking assist robot 1 based on the hardness information and the geometric information found from the walking environment map.

Some example embodiments have been described above. In the example embodiments described above, some of components constituting the walking assist robot 1 may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described embodiments, embodiments of the present disclosure can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. A control method of a robot, comprising:
    calculating calculated hardness information of a ground around the robot based on a mass associated with a wearer of the robot;
    controlling the robot according to the calculated hardness information; and
    searching for stored hardness information in a walking environment map based on a location of the robot, wherein
        the controlling the robot controls the robot according to the calculated hardness information, if a similarity between the calculated hardness information and the stored hardness information is above a threshold.

2. The control method according to claim 1, further comprising:
updating the stored hardness information based on the calculated hardness information, if the similarity between the calculated hardness information and the stored hardness information is below the threshold.

3. The control method according to claim 1, wherein the walking environment map includes geometric information associated with the ground.

4. The control method according to claim 3, wherein the walking environment map is divided into a plurality of boxes in a grid, and the method further comprises:
mapping the stored hardness information and geometric information associated with the ground to the grid.

5. A robot comprising:
a processor and a memory, the memory including computer readable code that, when executed by the processor, configure the processor to,
calculate calculated hardness information of a ground around the robot based on a mass associated with a wearer of the robot;
generate a control signal based on the calculated hardness information, the control signal controlling the robot; and
search for stored hardness information in a walking environment map based on a location of the robot.

6. The robot according to claim 5, wherein the processor is configured to generate the control signal according to the calculated hardness information, if the processor determines that a similarity between the calculated hardness information and the stored hardness information is above a threshold.

7. The robot according to claim 5, wherein the processor is configured to update the stored hardness information based on the calculated hardness information, if the processor determines that a similarity between the calculated hardness information and the stored hardness information is below a threshold.

8. The robot according to claim 5, wherein the walking environment map includes geometric information associated with the ground.

9. The robot according to claim 8, wherein the walking environment map is divided into a plurality of boxes in a grid, and
the processor is configured to map the stored hardness information and geometric information associated with the ground to the grid.

* * * * *